United States Patent
Qi et al.

(10) Patent No.: US 8,959,894 B2
(45) Date of Patent: Feb. 24, 2015

(54) MANGANESE-BASED OXIDES PROMOTED LEAN $NO_x$ TRAP (LNT) CATALYST

(75) Inventors: Gongshin Qi, Troy, MI (US); Wei Li, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1007 days.

(21) Appl. No.: 13/070,544

(22) Filed: Mar. 24, 2011

(65) Prior Publication Data

US 2012/0240554 A1 Sep. 27, 2012

(51) Int. Cl.
*F01N 3/20* (2006.01)
*F01N 3/08* (2006.01)
(Continued)

(52) U.S. Cl.
CPC .......... *F01N 3/0814* (2013.01); *B01D 53/9422* (2013.01); *B01D 53/9472* (2013.01); *B01D 53/9477* (2013.01); *F01N 3/0842* (2013.01); *B01J 37/0244* (2013.01); *B01J 37/031* (2013.01); *B01J 37/04* (2013.01); *B01J 35/0006* (2013.01); *B01J 23/34* (2013.01); *B01J 23/63* (2013.01); *B01J 23/6562* (2013.01); *B01J 35/023* (2013.01); *B01J 35/04* (2013.01); *B01J 37/0036* (2013.01); *F01N 13/009* (2013.01); *B01D 2255/1023* (2013.01); *B01D 2255/1025* (2013.01); *B01D 2255/2061* (2013.01); *B01D 2255/2065* (2013.01);
(Continued)

(58) Field of Classification Search
USPC ............................................. 60/285, 286, 301
See application file for complete search history.

(56) References Cited

U.S. PATENT DOCUMENTS 6,475,452 B1    11/2002    Hedouin et al.
6,548,032 B1*    4/2003    Barthe et al. ............... 423/213.2
(Continued)

FOREIGN PATENT DOCUMENTS

DE    69617993 T2    7/2002
WO    97/10892    3/1997

*Primary Examiner* — Kenneth Bomberg
*Assistant Examiner* — Jonathan Matthias
(74) *Attorney, Agent, or Firm* — Reising Ethington P.C.

(57) ABSTRACT

$MnO_x$-containing, base-metal oxide mixtures (e.g., $MnO_x$—$CeO_2$) are useful $NO_x$ oxidation catalyst materials and $NO_x$ storage materials in lean-burn engine exhaust gas treatments using Lean $NO_x$ Trap (LNT) systems. These oxidation catalyst materials are used in combination with a $NO_x$ storage material and a $NO_x$ reduction material. $MnO_x$-containing oxide mixtures can replace platinum (Pt) in LNT systems where the exhaust of the engine is repeatedly varied between a relatively long fuel-lean mode of operation and a relatively short fuel-rich mode of operation. The combination of the $MnO_x$ oxidation catalyst, $NO_x$ storage material, and $NO_x$ reduction catalyst material serves to complete the oxidation of unburned hydrocarbons and carbon monoxide, and to convert $NO_x$ to nitrogen.

18 Claims, 6 Drawing Sheets

(51) Int. Cl.
  *B01D 53/94* (2006.01)
  *B01J 37/02* (2006.01)
  *B01J 37/03* (2006.01)
  *B01J 37/04* (2006.01)
  *B01J 35/00* (2006.01)
  *B01J 23/34* (2006.01)
  *B01J 23/63* (2006.01)
  *B01J 23/656* (2006.01)
  *B01J 35/02* (2006.01)
  *B01J 35/04* (2006.01)
  *B01J 37/00* (2006.01)
  *F01N 13/00* (2010.01)
  *F02B 37/00* (2006.01)

(52) U.S. Cl.
  CPC ............... *B01D 2255/20715* (2013.01); *B01D 2255/2073* (2013.01); *B01D 2255/904* (2013.01); *B01D 2255/91* (2013.01); *B01D 2258/012* (2013.01); *B01D 53/944* (2013.01); *F02B 37/00* (2013.01); *F01N 2510/0682* (2013.01); *Y02T 10/24* (2013.01)
  USPC ............................................. 60/286; 60/301

(56) References Cited

U.S. PATENT DOCUMENTS

| | | | |
|---|---|---|---|
| 8,409,518 | B2 | 4/2013 | Kim et al. |
| 2005/0129601 | A1 | 6/2005 | Li et al. |
| 2012/0159927 | A1 | 6/2012 | Li et al. |

\* cited by examiner

MANGANESE-BASED OXIDES PROMOTED LEAN $NO_x$ TRAP (LNT) CATALYST

TECHNICAL FIELD

This disclosure pertains to an exhaust gas treatment system including a combination of an oxidation catalyst, a temporary storage material for nitrogen oxides, and a reduction catalyst for nitrogen oxides as part of a Lean $NO_x$ Trap (LNT) for a lean-burn internal combustion engine. More specifically, this invention pertains to manganese-based oxide particles for use in an LNT to promote the conversion of nitrogen oxide (NO) to nitrogen ($N_2$) in an exhaust gas treatment system of a lean-burn engine.

BACKGROUND OF THE INVENTION

Engines for automotive vehicles may be controlled, such as by computer modules, to operate at varying proportions of air and fuel in their combustion mixtures. Diesel engines, and other lean-burn combustion engines, are generally operated at a higher than stoichiometric air-to-fuel mass ratio to increase their fuel combustion efficiency and to improve their fuel economy. This mode of engine operation is known as "fuel-lean." The composition of the exhaust gas from an engine operating in a fuel-lean mode includes relatively high amounts of oxygen, water, and nitrogen oxides (mostly NO and $NO_2$, collectively $NO_x$). An exhaust gas with a high amount of oxygen typically comprises greater than about one percent $O_2$ by volume and up to about ten percent $O_2$ by volume. For example, the exhaust gas of a lean-burn diesel engine has a representative composition, by volume, of about 10% oxygen, 6% carbon dioxide, 0.1% carbon monoxide (CO), 180 ppm hydrocarbons (HC), 235 ppm $NO_x$ and the balance substantially nitrogen and water.

It is desired to reduce or convert regulated constituents, such as $NO_x$, CO, and HC, in an engine's exhaust gas to more innocuous gases, such as carbon dioxide ($CO_2$), nitrogen ($N_2$), and water ($H_2O$), before the gas is released to the ambient atmosphere. To accomplish these reactions, the exhaust gas may be passed through a treatment system where it can contact materials to promote the (1) oxidation of CO to $CO_2$, (2) oxidation of HC to $CO_2$ and water, and (3) reduction of $NO_x$ to $N_2$ and water. However, the high amounts of oxygen in the exhaust gas of a diesel or lean-burn engine may inhibit the catalytic reduction of $NO_x$ to $N_2$. But, when much of the NO is oxidized to $NO_2$, there are selective catalytic reduction additives and reaction methods for reducing much of the $NO_2$ to $N_2$ in the exhaust gas.

The exhaust gas treatment system of a lean-burn engine typically contains a diesel oxidation catalyst (DOC). When the exhaust gas stream is passed through the DOC it contacts a catalyst material, such as platinum, that is capable of oxidizing CO to $CO_2$, HC to $CO_2$ and water, and NO to $NO_2$. The exhaust gas may then be passed through a selective catalytic reduction (SCR) system located downstream of the oxidation catalyst within the treatment system. An SCR operates by injecting a reductant material, such as ammonia or unburned fuel constituents, into the exhaust gas stream before the gas is passed over a reduction catalyst material. The reduction catalyst material is configured to reduce an amount of $NO_2$ to $N_2$ in the exhaust gas in the presence of the reductant additive. However, these SCR systems require a reservoir of the reductant and a dosing device to inject a controlled amount of the reductant into the exhaust gas stream. Additionally, the reductant must be injected far enough upstream of the reduction catalyst material to ensure uniform mixing in the exhaust gas.

In another approach, an engine that primarily operates in a fuel-lean mode may be controlled to briefly operate in a fuel-rich mode to increase the amount of unburned fuel constituents in the exhaust gas. When the engine is operated in the fuel-rich mode, the fuel constituents in the exhaust gas promote the reduction of $NO_2$ to $N_2$ in the presence of a reduction catalyst. In this treatment method, the exhaust gas is passed in contact with a combination of materials that, when combined in a treatment system, are capable of efficiently reducing $NO_x$ to $N_2$. Such a combination is known as a Lean $NO_x$ Trap (LNT).

A conventional LNT includes a $NO_x$ oxidation catalyst, a $NO_x$ reduction catalyst, and a $NO_x$ storage material to temporarily store, or "trap," the $NO_x$. LNTs function under cyclical oxidizing and reducing exhaust gas conditions. And the desired cyclical exhaust gas environment is controlled by operating the associated engine in a fuel-lean mode for a major portion of an engine control cycle and in a fuel-rich mode for a minor portion of the cycle. The engine control cycle is repeated, and the desired cyclical oxidizing and reducing exhaust gas conditions are produced. However, conventional LNTs require the use of platinum (Pt) to effectively and timely oxidize NO (and CO and HC) in the exhaust gas during the fuel-lean mode of engine operation. Pt is a particularly expensive precious metal, and there is a need for a less-expensive catalyst material with equally comparable oxidation performance.

SUMMARY OF THE INVENTION

Our U.S. patent application Ser. No. 12/853,357, filed Aug. 10, 2010, now U.S. Pat. No. 8,057,767, issued Nov. 15, 2011, and assigned to the assignee of this invention, discloses the use of mixtures of manganese oxide ($MnO_x$) and one or more other base-metal oxides as effective catalysts in the oxidation of NO, CO, and HC in the oxygen-rich exhaust gas of a lean-burn combustion engine. Additionally, it was found that preferred manganese-containing base metal oxide mixtures could effectively replace or partially replace Pt as an oxidation catalyst in the treatment of exhaust gas from a lean-burn engine. These oxidation reactions were often conducted upstream of the introduction of urea or another reductant into the exhaust gas stream preparatory to the selective catalytic reduction of $NO_x$ to $N_2$ and water. The contents of our co-pending application are incorporated herein by reference, particularly for the disclosure of such manganese-containing base-metal oxides, and their preparation and use. For example, manganese is observed to exhibit several possible oxidation states in its oxides (e.g., +2, +3 and +4) depending on the gaseous environment in which it is employed. Two or more such oxides may exist in a particular oxidized manganese material and, therefore, such materials are designated in this specification as MnOx, where x may have values in the range of from 1 to 4 (or to about 4).

Now, it is found that such manganese-containing base-metal oxide mixtures may be prepared as catalysts and used in the treatment of an exhaust gas stream of a lean-burn engine as part of a Lean $NO_x$ Trap (LNT) system. In this method of exhaust gas treatment, the manganese-based oxide catalyst particles are combined with a $NO_x$ storage material and a $NO_x$ reduction catalyst material to promote the oxidation of nitrogen oxide (NO) to nitrogen dioxide ($NO_2$) in the exhaust gas. As discussed above, this combination of materials can cooperatively convert $NO_x$ to $N_2$ when they are cyclically exposed to an oxidizing and a reducing exhaust gas environment. In practices of this invention, use of these manganese-containing base-metal oxides helps to avoid the use of platinum or decrease the usage of Platinum in the LNT exhaust gas treatment system.

Further, it is found that such manganese-containing base-metal oxides have useful $NO_x$ adsorption capacity. Therefore, in a preferred embodiment of this invention, these manganese-based oxides may also be used during the fuel-lean engine control cycle as the $NO_x$ storage material in the LNT to temporarily store, or "trap" $NO_x$ by adsorption.

As discussed above, this LNT exhaust gas treatment system functions by operating an engine in a fuel-lean mode for a major portion of an engine control cycle, and in a fuel-rich mode for a minor portion of the cycle. When the engine is operated in the fuel-lean mode, the excess oxygen in the exhaust gas promotes the oxidation of NO to $NO_2$ over the manganese-based oxide catalyst material, and the removal of $NO_x$ from the exhaust gas by adsorption onto the storage material. When the engine is briefly operated in the fuel-rich mode, the fuel constituents in the exhaust gas trigger the release of $NO_x$ from the storage material (and the regeneration of $NO_x$ storages sites), and promote the reduction of the released $NO_x$ to $N_2$ and water over the reducing catalyst material. By repeating this engine control cycle, the three LNT materials (oxidizing, reducing, and storing) can cooperatively remove $NO_x$ from the exhaust gas produced by the engine. The duration of each cycle and mode is optimized so that the $NO_x$ storage sites on the storage material are frequently regenerated, and the disclosed LNT continuously produces a treated exhaust gas flow with acceptably low levels of $NO_x$.

The engine's mode of operation is determined by an electronic control module (ECM) that controls the electronic fuel injection system, as well as other engine components. The electronic fuel injection system, in turn, continuously manages the mixture of air and fuel that is delivered to the engine in accordance with an engine control strategy. In this way, the duration of each cycle and mode of engine operation may be optimized.

The LNT reactor, with its manganese-based oxide component, is located in the path of an exhaust gas stream from a lean-burn engine as part of an exhaust gas treatment system. In some embodiments of this invention, a mixture of all three LNT materials (oxidation, storage, and reduction) are prepared and used in a single location in the exhaust gas stream. The mixture may be suitably supported and contained within a flow-through container for treatment of the exhaust gas as it is cycled from fuel-rich to fuel-lean modes of operation. For example, a fine particle mixture of the three LNT materials may be applied as a washcoat on the channel wall surfaces of an extruded, flow-through honeycomb support body.

In another embodiment of the invention, the respective LNT materials may be spaced for sequential engagement by the exhaust gas. In such embodiments, the manganese-based oxides oxidation catalyst material would be preferably placed upstream with a mixture of storage and reduction catalyst materials immediately downstream. Alternatively, the LNT materials may be placed within the exhaust gas stream so that the exhaust gas passes in contact with the manganese-based oxide catalyst material first, then the LNT storage material, and finally, the LNT reduction catalyst material in immediate succession.

One method of spacing the three LNT materials apart from each other is by controlling the manner in which they are deposited onto the support body. For example, at least one of the LNT materials may be deposited on one-half of the support body near the upstream opening, and the other LNT materials may be deposited on the remaining half of the support body near the downstream opening. In this example, the manganese-based oxide oxidation catalyst material may be deposited on the upstream portion of the support body, and the LNT storage and reduction materials may be deposited on the downstream portion of the support body. This arrangement provides two equally-sized and substantially distinguishable reactor beds that, together, span the entire support body. In another example, the LNT materials may be deposited in an alternating arrangement on the support body from the upstream to the downstream opening. This arrangement provides multiple alternating and substantially distinguishable reactor beds that span the entire support body.

Another method of spacing the LNT materials apart from each other is by using a pair of partitioned containers arranged in serial along the path of the exhaust gas stream to form the LNT system. Both the upstream and downstream containers house a support body, wherein the upstream container may carry at least one of the LNT materials and the downstream container may carry at least one of the other LNT materials. And the first container may or may not contain some of the same of different LNT materials. In yet another embodiment, the LNT reactor may include two or more partitioned containers arranged in serial along the path of the exhaust gas stream in the treatment system, with each container housing a support body that carries the same or different LNT materials.

Examples of preferred manganese-containing base-metal oxides include $MnO_x$—$CeO_2$, $MnO_x$—$ZrO_2$ and $MnO_x$—$Y_2O_3$, as all three of these mixed oxides were able to oxidize about 80% of NO at a temperature of 300° C. in a synthetic oxygen and water containing gas stream. Preparation of these manganese-based mixed oxides as particle catalysts involves dissolving metal nitrates thereof in an aqueous solution and co-precipitating a metal solution therefrom. The precipitate is then aged, dried, and calcined to form an intimate solid solution of the manganese-based oxides. At least one of the manganese-based oxides is combined with alumina sol and water, and balled milled to form a slurry, wherein the size of the manganese-based oxide particles is about 10 to 20 nanometers. The slurry is then washcoated onto a support body, which is dried and calcined so that the catalyst particles adhere to the support body walls. The support body is housed within a flow-through container located in the path of an exhaust gas stream, wherein the exhaust gas is passed through the container where it contacts the catalyst particles and exits the container as a treated exhaust gas stream.

The LNT storage material may be of any suitable material known to skilled artisans that can store or "trap" $NO_2$ under oxidizing conditions and release $NO_x$ gases under reducing conditions. For example, alkali or alkaline earth metal compounds, such as BaO, $BaCO_3$, MgO, SrO or $K_2CO_3$, may be used as the LNT storage material and may be supported by an aluminum oxide ($Al_2O_3$) carrier material, although other carrier materials are possible, such as $CeO_2$, $CeO_2$—$ZrO_2$, Ce—Pr—La—$O_x$. Additionally, any of the manganese-based oxides listed above may be used in the LNT system for low-temperature adsorption of $NO_x$, and these oxides may or may not be combined with BaO, $BaCO_3$, or $K_2CO_3$.

The LNT reduction catalyst material may be of any suitable material known to skilled artisans that can reduce $NO_x$ gases to $N_2$ under reducing conditions. For example, precious metals of palladium (Pd) or rhodium (Rh) may be used as the LNT reduction catalyst material and may be supported by an aluminum oxide ($Al_2O_3$) or a cerium-zirconium oxide ($CeO_2$—$ZrO_2$) carrier material.

A preferred combination of LNT materials consists of a manganese-containing base-metal oxide, rhodium (Rh), palladium (Pd), and barium oxide (BaO). This catalyst mixture preferably does not contain platinum. To form the manganese-based oxide LNT reactor bed, the manganese-based oxides are ball-milled together with $Rh/CeO_2$—$ZrO_2$, $Pd/Al_2O_3$, $BaO/Al_2O_3$ to form a slurry. After ball milling, the slurry is washcoated onto a monolith core, which is dried and calcined. The preferred size of the deposited catalyst particles is about 10 to 20 nanometers. The preferred loading of the LNT materials on the support body is about 200 g per liter of available flow volume, with 20 g/L BaO, 50 g/ft³ Pd, 5 g/ft³ Rh and 30 g/L manganese-based mixed oxides.

Other objects and advantages of the invention will be apparent from a further description of preferred (but not-limiting) embodiments of the invention.

DESCRIPTION OF PREFERRED EMBODIMENTS

Figure 1:
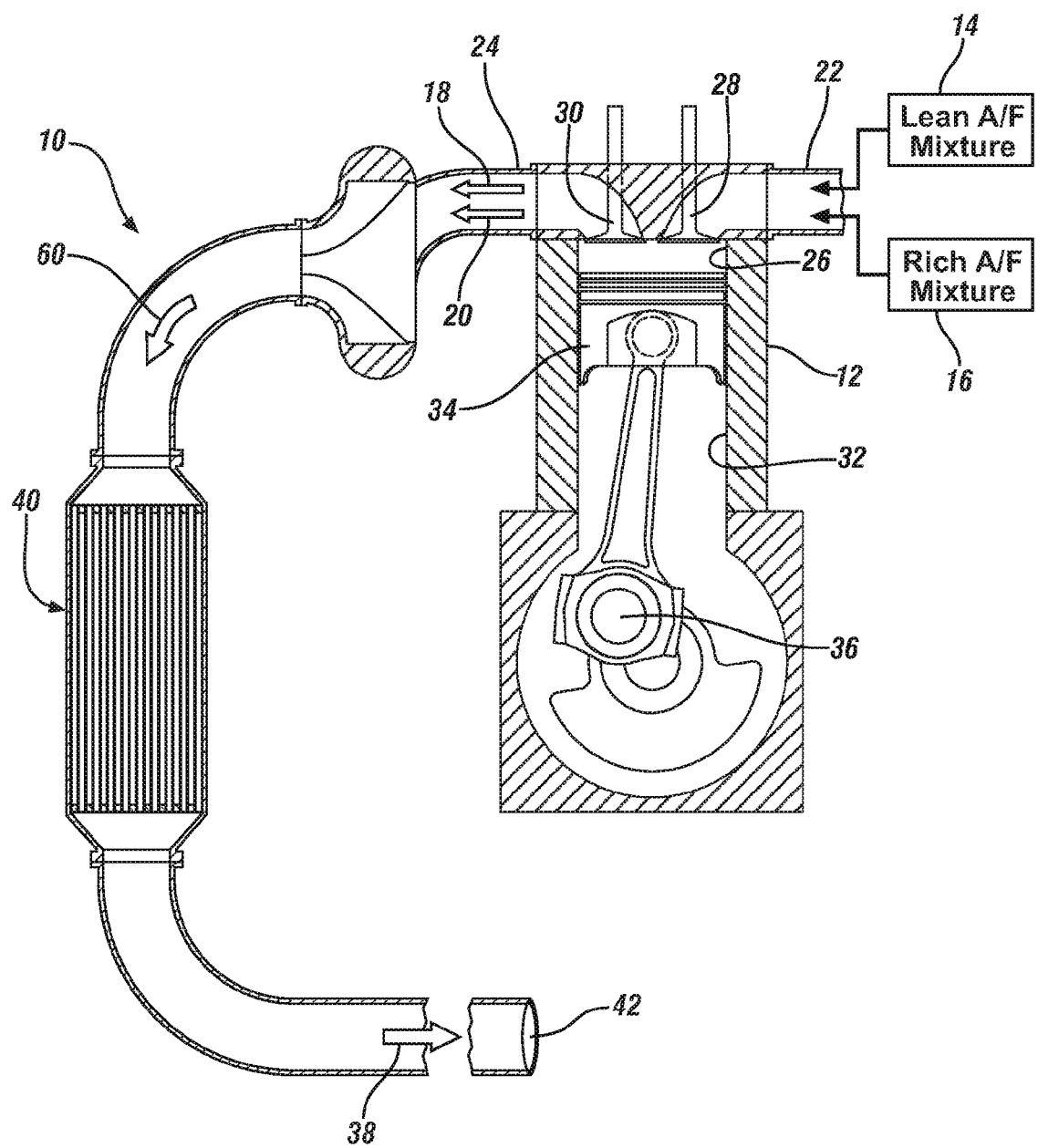
FIG. 1 is a schematic illustration of the path of a gas stream containing a mixture of air and fuel that is delivered to the cylinders of a diesel, or other lean-burn internal combustion engine, exits the engine from the exhaust manifold as an exhaust gas stream into the exhaust gas treatment system, which communicates the gas stream through an LNT reactor containing at least one LNT material where the exhaust gas reacts with the at least one LNT material and exits the LNT as a treated exhaust gas stream, which is expelled from the treatment system through a tailpipe opening to the ambient atmosphere.

The exhaust gas from a lean-burning combustion engine contains relatively high concentrations of nitrogen oxides ($NO_x$), about 50 ppmv to about 1,500 ppmv, and includes greater than 90 mol % NO and less than 10 mol % $NO_2$. It is desired to treat this exhaust gas so as to minimize the discharge of NO to the atmosphere; however, the high amount of oxygen in the exhaust gas may inhibit the catalytic reduction of $NO_x$ to $N_2$. It is found that when much of the NO is oxidized to $NO_2$, the $NO_2$ can then be reduced to $N_2$. Therefore, the exhaust gas of a lean-burning combustion engine may be passed in contact with a catalyst material, or collection of catalyst materials, to help oxidize NO to $NO_2$, and help reduce NO and $NO_2$ to $N_2$, and thereby reduce the amount of $NO_x$ in the exhaust gas.

Currently, a platinum-based (Pt) catalyst material is found to be the most active and commercially available option for promoting the oxidation of NO to $NO_2$. Additionally, the need for high NO conversion to $NO_2$ has resulted in exhaust gas treatment systems that contain high loadings of Pt, which is expensive. Furthermore, Pt has been shown to suffer from poor thermal durability at higher temperatures. Consequently, there are substantial interests in the development of a comparable, if not better performing, low-cost, and more durable NO oxidation catalyst. In the present invention, manganese-containing base-metal oxide mixtures are prepared for use as effective and lower-cost oxidation catalysts to promote the conversion of nitrogen oxide (NO) to nitrogen dioxide ($NO_2$) in an oxygen-rich exhaust gas.

The Lean $NO_x$ Trap (LNT) system, as disclosed herein, is a collection of particulate materials capable of converting $NO_x$ to $N_2$ in the high-oxygen exhaust gas of a lean-burn engine. The LNT system combines (1) an oxidation catalyst material capable of oxidizing NO to $NO_2$, (2) a storage material capable of temporarily storing, or "trapping," $NO_x$ and removing it from the exhaust gas, and (3) a reduction catalyst material capable of reducing NO and $NO_2$ to $N_2$. The three LNT materials (oxidizing, storing, and reducing) cooperatively convert $NO_x$ to $N_2$ when they are cyclically exposed to an oxidizing exhaust gas environment and a reducing exhaust gas environment. The desired cyclical exhaust gas environment is created by operating the associated engine in a fuel-lean mode for a major portion of an engine control cycle and in a fuel-rich mode for a minor portion of the engine cycle.

Typically, a diesel engine operates by burning a mixture of air and fuel with an air-to-fuel (A/F) mass ratio that is greater than the stoichiometric A/F ratio, otherwise referred to as a "lean" mixture. The stoichiometric A/F ratio of diesel fuel is approximately 14.7, but the A/F ratio burned in a typical diesel engine is 17 or greater. A lean mixture of air and fuel contains more oxygen than is necessary for complete fuel combustion, and, when it is burned in an engine, results in an exhaust gas containing higher concentrations of oxygen (e.g. about one to ten percent by volume). Engines that burn lean mixtures of air and fuel are fuel-efficient, and the resultant exhaust gas contains low amounts of unburned fuel constituents (e.g., about 250 to 750 ppmv HC) and nominal amounts of CO. That is, a lean-burn engine typically produces an oxidizing exhaust gas environment.

Alternatively, a mixture of air and fuel with an A/F ratio that is equal to or less than the stoichiometric A/F ratio is referred to as a "rich" mixture. A mixture with an A/F ratio equal to the stoichiometric ratio contains just enough oxygen to completely burn the fuel, while a mixture with an A/F ratio less than the stoichiometric ratio contains an abundance of fuel. When either mixture is burned in a combustion engine the effluent exhaust gas contains low concentrations of oxygen (e.g., less than one volume percent), and relatively high amounts of CO and HCs (e.g., about 0.5 to 1.0 vol. % and about 500 to 1,000 ppmv, respectively). As such, rich-burn engines typically produce a reducing exhaust gas environment.

Therefore, the combustion engine disclosed herein is operated by burning a controllable mixture of air and fuel that is either lean or rich with respect to the stoichiometric A/F ratio, which produces an exhaust gas with either an oxidizing or reducing environment. When the engine is operated in a fuel-lean mode, the excess oxygen in the exhaust gas promotes the oxidation of NO to $NO_2$ over the oxidation catalyst material, and the removal of $NO_x$ from the exhaust gas by adsorption onto the storage material. When the engine is operated in a fuel-rich mode, the fuel constituents in the exhaust gas trigger the release of $NO_x$ from the storage material (and the regeneration of $NO_x$ storages sites), and promote the reduction of the released $NO_x$ to $N_2$ over the reduction catalyst material.

The engine is cyclically operated between fuel-lean and fuel-rich modes so that the three LNT materials (oxidizing, reducing, and storing) can cooperatively remove $NO_x$ from the exhaust gas produced by the engine. Additionally, the duration of each cycle and mode is optimized so that the $NO_x$ storage sites on the storage material are frequently regenerated, and the LNT system continuously produces a treated exhaust gas flow with acceptably low levels of $NO_x$.

FIG. 1 illustrates a first embodiment of the exhaust gas treatment system 10 including a Lean $NO_x$ Trap (LNT) system 40 for an internal combustion engine 12. As discussed above, the engine 12 cyclically operates by burning a lean mixture of air and fuel 14 ("lean A/F mixture") and a rich mixture of air and fuel 16 ("rich A/F mixture") to correspondingly provide an oxidizing exhaust gas environment 18 and a reducing exhaust gas environment 20 to the treatment system 10.

The multi-cylinder, reciprocating piston, internal combustion engine 12 may be a charge compression engine (i.e., diesel engine), a spark ignition direct injection engine (i.e., gasoline engine), or a homogeneous charge compression ignition engine. Each of these types of engines includes cylinders 32 (usually four to eight cylinders) that accommodate reciprocating piston heads 34 connected to a crankshaft 36. Located above each piston head 34 is a combustion chamber 26 that sequentially receives the lean A/F mixture 14 or the rich A/F mixture 16 through an intake valve 28 at specifically timed intervals. The spark or compression assisted ignition of the lean or rich A/F mixture 14, 16 in the combustion chambers 26 invokes rapid downward linear movement of their respective piston heads 34 to drive rotation of the crankshaft 36. The reactive upward movement of each piston head 34, a short time later, expels the combustion products from each combustion chamber 26 through an exhaust valve 30.

It should be noted that FIG. 1 identifies separate feeds of the lean A/F mixture 14 and the rich A/F mixture 16 and separate flows of the oxidizing exhaust gas 18 and the reducing exhaust gas 20 for ease of description only. The engine 12, in actuality, is supplied with a continuous air flow at a variable mass flow rate responsive to engine performance demands (i.e, pressing and depressing a foot pedal located in the driver-side compartment to affect vehicle speed and acceleration). A calculated quantity of pressurized fuel is rapidly and intermittently injected into an incoming air flow just upstream from the engine 12, as dictated, for example, by an engine control strategy, to produce a mixture of air and fuel that exhibits the instantly desired air to fuel mass ratio. The quantity of fuel injected into the incoming air flow is controlled to maintain a lean air to fuel mass ratio (the lean A/F mixture 14) or a rich air to fuel mass ratio (the rich A/F mixture 16), or to switch between the two states.

The mixture of air and fuel 14, 16 enters an intake manifold 22 of the internal combustion engine 12 and exits as an exhaust gas 18, 20 through the exhaust manifold 24. The air portion of the lean or rich A/F mixture 14, 16 is supplied by an air induction system (not shown) that includes a throttle body valve. The fuel portion of the lean or rich A/F mixture 14, 16 is supplied by fuel injectors (not shown) that dispense pressurized fuel into the incoming air flow. An electronic fuel injection system (not shown) may continuously manage the mixture of air and fuel delivered to the engine 12 in accordance with an engine control strategy. The electronic fuel injection system utilizes an electronic control module (ECM) that sends corresponding output signals to the fuel injectors located on the engine 12 to dispense the proper amount of fuel into the incoming air flow.

The intake manifold 22 delivers the air and fuel mixture 14, 16 into the combustion chambers 26 through the intake valve 28 and then to the cylinders 32 of the engine 12. The air and fuel mixture 14, 16 is compressed, heated, and thereby ignited to power the reciprocating pistons 34 in the cylinders 32 of the engine 12. The spent combustion products are expelled from the cylinders 32 of the engine 12 by the exhaust strokes of the pistons 34 and into the exhaust manifold 24 through the exhaust valve 30. The exhaust manifold 24 delivers the combustion products to the exhaust gas treatment system 10 as the oxidizing exhaust gas 18 (when the lean A/F mixture 14 is burned) or the reducing exhaust gas 20 (when the rich A/F mixture 16 is burned). The treatment system alternately communicates the oxidizing exhaust gas 18 and the reducing exhaust gas 20 to the LNT reactor 40 for the $NO_x$ conversion reactions.

Figure 2:
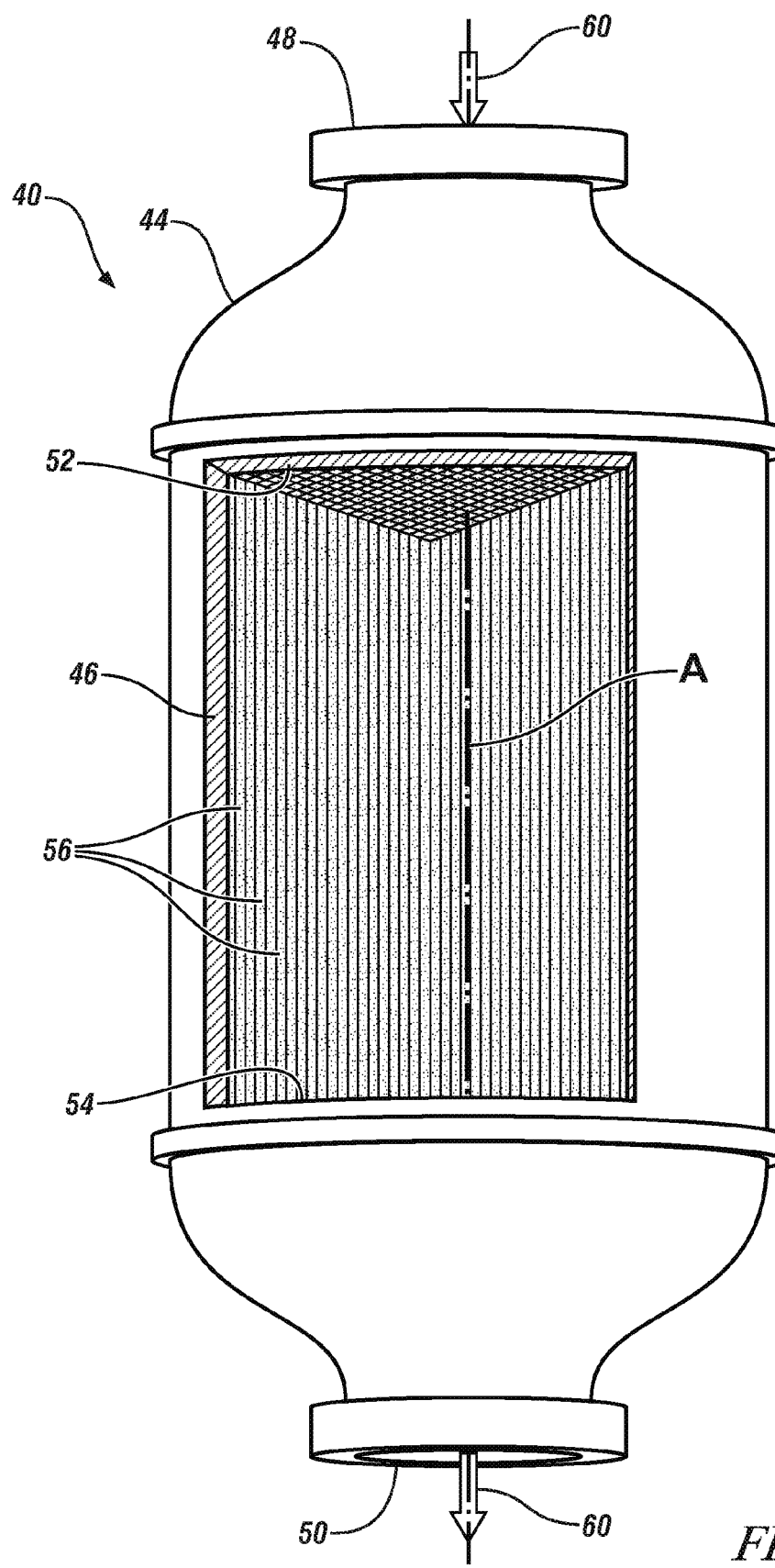
FIG. 2 is a schematic illustration of an LNT reactor located in the exhaust gas treatment system shown in FIG. 1 and depicts a container housing a catalyst-bearing support body with a wedge cut away from a portion of the container and the support body to better reveal the square-shaped passages of the parallel flow-through channels extending longitudinally from the upstream face to the downstream face of the honeycomb-shaped monolith support.
Figure 3:
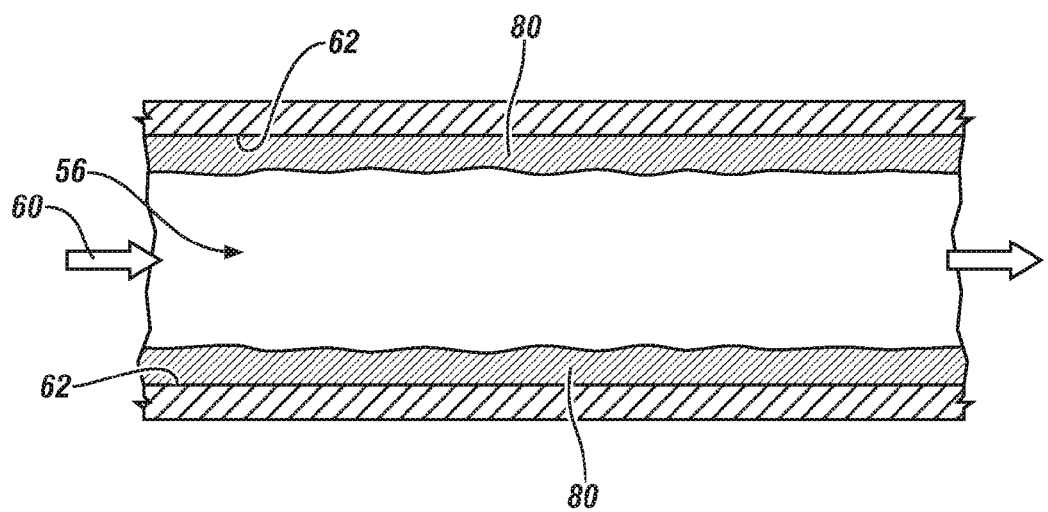
FIG. 3 is a schematic illustration of a cross-section of a fragment of a flow-through channel within the support body shown in FIG. 2 and depicts a thin washcoat layer deposited on the wall surfaces of the flow-through channel, wherein the washcoat contains a mixture of all three of the LNT materials (oxidizing, storing, reducing).

As shown in FIGS. 1-3, the exhaust gas stream 60 enters the LNT reactor 40 and passes through the flow-through channels 56 of the support body 46 where it contacts the LNT particulate materials (oxidizing, reducing, and storing) that are dispersed on the wall surfaces 62 of the channels 56 in a thin washcoat layer 80. The high surface area of the channel walls 62 creates sufficient contact between the exhaust gas and the three LNT materials for the desired $NO_x$ conversion reactions to occur. The exhaust gas treatment system 10 then communicates the exhaust gas stream 60 from the LNT reactor 40 as a treated exhaust gas stream 38. This treated exhaust gas 38 is expelled from the treatment system 10 through a tailpipe opening 42 to the ambient atmosphere.

A suitable LNT reactor 40 for the conversion reactions disclosed herein is shown in FIG. 2, and comprises an alloy steel container 44 shaped with an upstream opening 48 for exhaust gas entry, and a downstream opening 50 for exhaust gas through-flow. The body of the container 44 is often round or elliptical in cross-section and sized to hold a flow-through catalyst-bearing support body 46 for promoting the desired $NO_x$ conversion reactions in the flowing exhaust gas stream 60.

The support body 46, as shown in partial cross-section, is a ceramic, honeycomb-shaped monolith with flat end faces 52, 54 transverse to the exhaust gas stream 60 (that is, along the flow axis A), and includes several small, square, parallel flow-through channels 56 extending longitudinally from the upstream face 52 to the downstream face 54. Since each channel 56 is small in cross-section for admitting the exhaust gas stream 60, the upstream face 52 of the monolith is sized to provide a suitable number of channels 56 to collectively accommodate a desired flow rate for the exhaust gas stream 60. While extruded, honeycomb-shaped monoliths have proven effective and durable for diesel exhaust LNT reactors, other catalyst support bodies and other formed catalyst shapes may be used. The support body 46 may be formed of any material capable of withstanding the temperature and chemical conditions associated with the oxidizing and reducing exhaust gas 18, 20 environments. Specific examples of materials that may be used include ceramics, such as extruded cordierite, silicon carbide, or a heat and corrosion resistant metal such as titanium or stainless steel.

Figure 4:
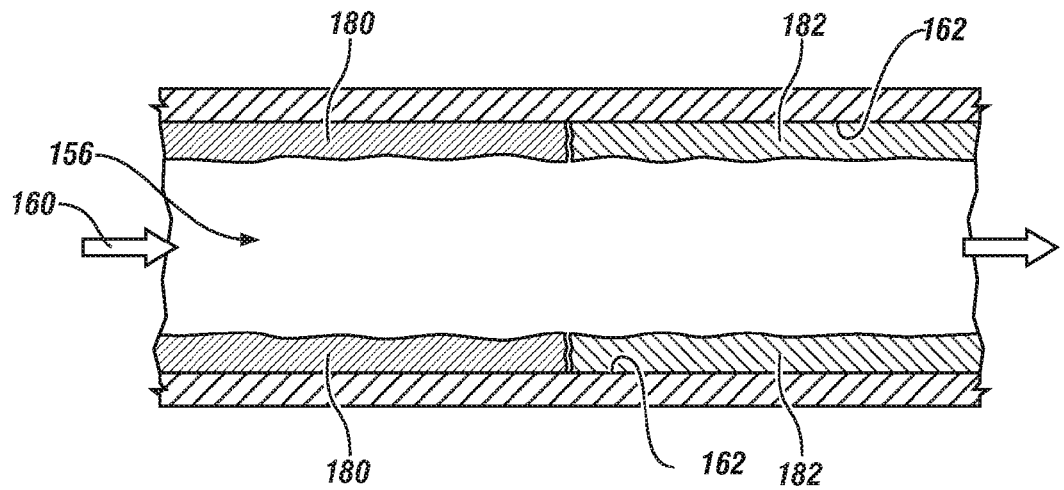
FIG. 4 is a schematic illustration of a cross-section of a fragment of a flow-through channel within the support body shown in FIG. 2 and depicts a first washcoat layer deposited on an upstream portion the flow-through channel and a second washcoat layer deposited on a downstream portion of the flow-through channel.
Figure 5:
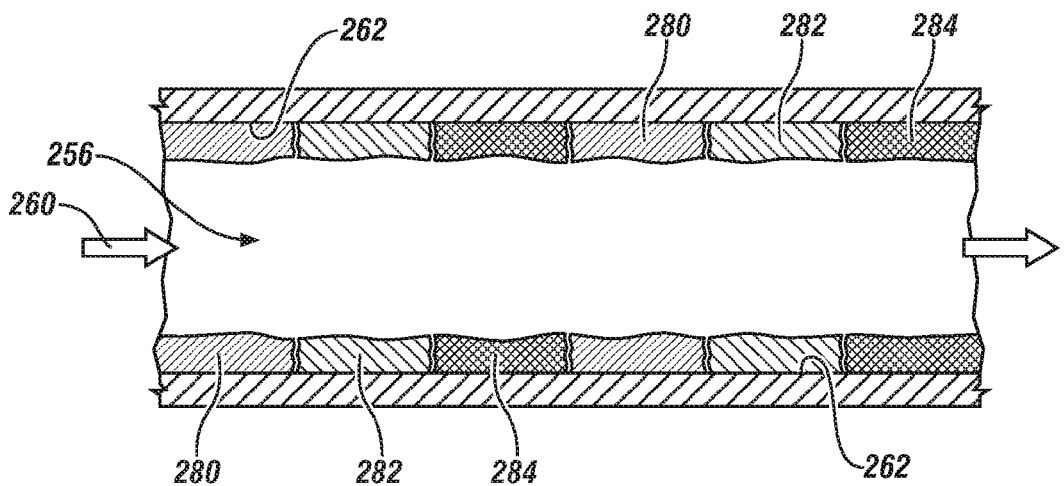
FIG. 5 is a schematic illustration of a cross-section of a fragment of a flow-through channel within the support body shown in FIG. 2 and depicts first, second, and third washcoat layers separately and alternatively deposited along the length of the flow-through channel.

As shown in FIGS. 3-5, small particles of at least one of the three LNT materials are deposited on the wall surfaces 62 of the flow-through channels 56, and several deposition arrangements are possible. For example, FIG. 3 depicts a fragmentary view of one channel 56 with a deposition arrangement wherein a mixture of the three LNT materials (oxidizing, storing, and reducing) is deposited evenly along the wall surfaces 62 of the support body 46 (FIG. 2) in a thin washcoat layer 80. In this arrangement, the exhaust gas stream 60 passes through the channels 56, where it contacts the porous washcoat layer 80 and the LNT materials dispersed therein. The washcoat layer 80 and flow-through channels 56 shown in FIGS. 3-5 are merely idealized depictions; they are not drawn to scale and are not meant to represent the actual dispersal pattern of the LNT materials. For example, a thin washcoat layer carrying particles of one or more of the LNT materials may be deposited on top of a high surface area particulate carrier material, but this is not required.

FIG. 4 depicts a fragmentary view of one channel 156 with a deposition arrangement, wherein a first washcoat layer 180 is deposited on one-half of the wall surfaces 162 of the support body 46 (FIG. 2) near the upstream face 52 and a second washcoat layer 182 is deposited on the remaining half of the wall surfaces 162 of the support body 46 near the downstream face 54. The first washcoat layer 180 may include the oxidation catalyst material, i.e. the manganese-based oxide particles, and the second washcoat layer 182 may comprise particles of the storage material and reduction catalyst material. This arrangement provides two equally sized and substantially distinguishable reactor beds that together span the entire support body 46. And, when the exhaust gas stream 160 passes through the channels 156, it contacts the porous washcoat layers 180 and 182 and the LNT materials dispersed therein.

FIG. 5 depicts a fragmentary view of one channel 256 with a deposition arrangement, wherein a first washcoat layer 280, a second washcoat layer 282, and a third washcoat layer 284 are alternately deposited several times on the wall surfaces 262 of the support body 46 (FIG. 2) from the upstream face 52 to the downstream face 54. Each of the first, second, and third washcoat layers 280, 282, 284 may include any of the LNT materials individually or in combination. This arrangement provides multiple, alternating and substantially distinguishable reactor beds that span the entire support body 46. And, when the exhaust gas stream 260 passes through the channels 256, it contacts the porous washcoat layers 280, 282, and 284 and the LNT materials dispersed therein.

Figure 6:
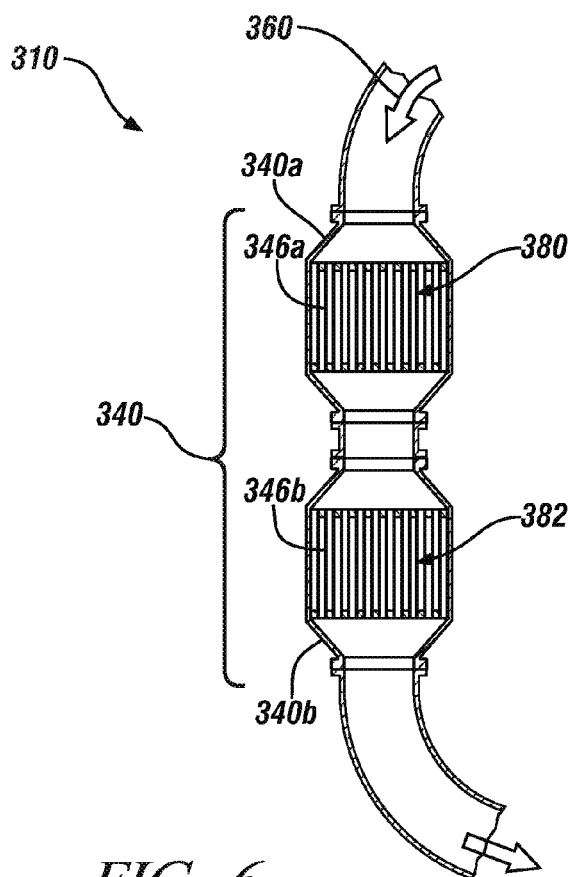
FIG. 6 is a schematic illustration of another embodiment of the LNT reactor shown in FIG. 1 and depicts a pair of partitioned containers housing separate catalyst-bearing support bodies for further promoting the LNT reactions.

In another embodiment, as shown in FIG. 6, the LNT reactor 340 includes a pair of partitioned containers 340*a*, 340*b* arranged in serial along the path of the exhaust gas stream 360 in the exhaust gas treatment system 310. The upstream container 340*a* houses a support body 346*a* that carries one or more washcoat layers 380 dispersed on the wall surfaces 62, 162, 262 (FIGS. 3-5) of the of the flow-through channels 56, 156, 256 and the downstream container 340*b* houses a support body 346*b* that carries one or more washcoat layers 382 dispersed on the wall surfaces 62, 162, 262 (FIGS. 3-5) of the of the flow-through channels 56, 156, 256. The first washcoat layer 380 may or may not have the same composition as the second washcoat layer 382. This alternative structural arrangement of the LNT reactor 340 may increase the overall conversion of $NO_x$ to $N_2$ by providing supplemental selective catalytic $NO_x$ reduction for $NO_x$ that may slip through the upstream container 340*a*. Additionally, this structural arrangement facilitates maintenance and enhances turbulent flow through the exhaust gas treatment system 310.

In yet another embodiment, the LNT reactor may include two or more partitioned containers arranged in serial along the path of the exhaust gas stream in the treatment system (not shown). Each container may house a support body that carries the same or different LNT materials dispersed in a thin washcoat layer on the channel walls. In this way, certain LNT reactions can take place in isolation of each other, which may increase the overall reduction of $NO_x$, CO and HCs in the exhaust gas.

The LNT materials (oxidizing, storing, and reducing) work in combination to efficiently convert $NO_x$ to $N_2$ through a multi-part reaction mechanism. When the engine 12 is operated by burning a lean A/F mixture 14, for instance, the oxidation catalyst material (i.e. a mixture of manganese-based oxides) oxidizes NO contained in the oxidizing exhaust gas 18 into $NO_2$. At the same time, the storage material stores, or "traps," both the native and newly-generated $NO_x$. The oxidation of NO and the storage of $NO_2$ occurs until the storage material reaches or approaches its storage capacity. The stored nitrogen oxides are then removed from the storage material to regenerate trap sites for future $NO_x$ storage. The release of $NO_x$ from the storage material is accomplished by temporarily delivering a rich A/F mixture 16 to the engine 12, so that combustion within the engine 12 produces the reducing exhaust gas 20. The drop in oxygen content and the increase in reductants (i.e., CO, HC's, and $H_2$) in the reducing exhaust gas 20 render the stored NO thermodynamically unstable and cause $NO_x$ liberation. The available reductants then reduce the liberated $NO_x$ over the reduction catalyst material. Once regeneration of the storage material is satisfactorily achieved, delivery of the lean A/F mixture 14 may be restored to the engine 12 and the cycle repeated. The reductants contained in the oxidizing exhaust gas 18 (HC's) and the reducing exhaust gas (CO, HC's, $H_2$) are also oxidized by the manganese-based oxide particles in the oxidation catalyst material and, if present, by palladium particles dispersed in the washcoat layers.

A method of using the LNT reactor 40 in the exhaust gas treatment system 10 should be apparent to a skilled artisan given the above disclosure. The method includes delivering the lean A/F mixture 14 to the engine 12 for combustion. The lean A/F mixture 14 is burned inside engine's cylinders 32 and the resultant oxidizing exhaust gas 18 is communicated to the exhaust gas treatment system 10. The LNT reactor 40 receives the oxidizing exhaust gas 18 stream 60 at the upstream opening 48 of the container 44. The oxidizing exhaust gas 18 passes from the upstream opening 48 to the downstream opening 50 and traverses the support body 46 through the many flow-through channels 56. The oxidation catalyst material oxidizes NO to $NO_2$. The storage material traps the $NO_2$ contained in the oxidizing exhaust gas 18 and. Then, when appropriate, the method calls for adjusting the air to fuel mass ratio in the air and fuel mixture to deliver a rich A/F mixture 16 to the engine 12 for combustion. When the engine 12 operates by burning the rich A/F mixture 16, the resultant reducing exhaust gas 20 is communicated to the exhaust gas treatment system 10. The reducing exhaust gas 20 traverses the support body 46 through the many flow-through channels 56 and purges the storage material of $NO_x$. The liberated $NO_x$ is reduced over the reduction catalyst material to $N_2$ by the reductants contained in the reducing exhaust gas 20. The method eventually calls for adjusting the air to fuel mass ratio in the air and fuel mixture back to the lean A/F mixture 14.

The preferred LNT oxidation catalyst material comprises particles of a manganese-based mixed oxide integrally combined with at least one other base-metal oxide (manganese-based oxides). These manganese-based oxides usually had much higher catalytic activity than manganese oxide individually because of the strong interaction due to the formation of a solid solution between the two components.

Examples of preferred manganese-based oxides include $MnO_x$—$CeO_2$, $MnO_x$—$ZrO_2$ and $MnO_x$—$Y_2O_3$, as all three of these oxides were able to oxidize about 80% of NO at 300° C. in a synthetic oxygen and water containing gas stream when prepared as particle catalysts and washcoated onto monolith core samples.

In a second iteration, the three manganese-based oxide catalysts were compared to each other, with $MnO_x$—$CeO_2$ showing slightly higher $NO_x$ oxidation performance overall. Therefore, in another embodiment of the present invention, $MnO_x$—$CeO_2$ is the preferred oxidation catalyst.

Without being bound by theory, the higher oxidation activity of $MnO_x$—$CeO_2$ is related to the oxygen vacancy formed in the $CeO_2$ lattice due to the incorporation of metal atoms and the highly dispersed metal oxides. When the oxygen vacancy is relinquished by adsorbing oxygen from the environment, molecular oxygen is absorbed and activated to form a reactive oxygen compound, and thus enhance the NO oxidation activity. Additionally, the NO oxidation activity of a physical mixture of $Mn_2O_3$ and $CeO_2$ is lower than that of a co-precipitated $Mn_2O_3$—$CeO_2$ because there likely exists a synergistic mechanism between the manganese and cerium oxides, which can be regarded as a process of oxygen activation and oxygen transfer through the redox cycles of $Mn^{4+}/Mn^{3+}$ and $Ce^{4+}/Ce^{3+}$. This relationship, as theorized, is depicted below:

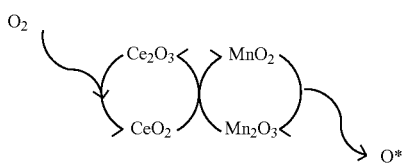

In a third iteration, the atomic ratio of Mn to the total $MnO_x$—$CeO_2$ metal, i.e. Mn/(Ce+Mn), was varied. Five $Mn_xCe_{1-x}O_2$ catalysts were prepared, with x=0, 0.1, 0.3, 0.5 and 1, and $MnO_x(0.3)$-$CeO_2$ showed the best NO oxidation activity among these catalysts. Therefore, in another embodiment, $MnO_x(0.3)$-$CeO_2$ is the preferred oxidation catalyst.

In a fourth iteration, NO oxidation activity was evaluated over a $MnO_x(0.3)$-$CeO_2$ catalyst and a Pd catalyst, separately and in combination, in a synthesized diesel engine exhaust gas stream containing 3000 ppm CO and 500 ppm $C_3H_6$/$C_3H_8$. The combination of $MnO_x(0.3)$-$CeO_2$ and Pd in a catalyst significantly improved the oxidation of NO, CO and $C_3H_6$ as compared to the $MnO_x(0.3)$-$CeO_2$ catalyst alone. Therefore, in yet another embodiment, the combination of $MnO_x(0.3)$-$CeO_2$ and Pd is the preferred NO oxidation catalyst in a gas stream containing CO and HCs.

The ability of these manganese-based oxides to efficiently oxidize NO to $NO_2$ may significantly diminish or altogether eliminate the need to include platinum as an oxidation catalyst material in the LNT reactor 40.

The particulate storage material may be of any suitable material known to skilled artisans that can store or "trap" $NO_2$ under oxidizing conditions, and release $NO_x$ gases during reducing conditions. A number of alkali or alkaline earth metal compounds operate in such a fashion through the reversible formation of a nitrate species. Some specific and exemplary alkali or alkaline earth metal compounds that may be employed include BaO, $BaCO_3$, $CeO_2$, $CeO_2$—$ZrO_2$, Ce—Pr—La—$O_x$ and $K_2CO_3$.

As discussed in Experiments 6 and 7 of this Specification, $MnO_x$—$CeO_2$ exhibits high $NO_x$ adsorption capacity in an excess-oxygen environment at temperatures below 200° C. Therefore, the preferred manganese-based oxides may also be used as the LNT storage material for low-temperature adsorption of $NO_x$. In another embodiment, the preferred manganese-based oxides may be combined with BaO, $BaCO_3$, or $K_2CO_3$ as the LNT storage material.

The LNT reduction catalyst material may be of any suitable material known to skilled artisans that can reduce $NO_x$ gases to $N_2$ under reducing conditions. Two specific precious metals that may be employed include palladium (Pd) and rhodium (Rh).

The LNT materials may be deposited on top of a high surface area conglomerate of a particulate carrier material. The carrier material may, for example, comprise a high-surface area mixed cerium and zirconium oxide material ($CeO_2$—$ZrO_2$). This material provides a high-surface area as well as some additional relevant functionality. $CeO_2$—$ZrO_2$ materials have, more specifically, demonstrated some ability to enhance the $NO_2$ storage at low temperatures, stabilize certain catalysts so that loading requirements can be reduced, and promote the water-gas shift reaction. The carrier material may also comprise alumina ($Al_2O_3$), $CeO_2$, a ZSM-5 zeolite, or any other suitable material known to skilled artisans.

A preferred combination of LNT catalyst materials consists of a manganese-containing base-metal oxide, rhodium (Rh), palladium (Pd), and barium oxide (BaO). The Rh catalyst material is preferably loaded onto a mixed cerium and zirconium oxide carrier material ($CeO_2$—$ZrO_2$), and the Pd and BaO materials are preferably loaded onto an alumina oxide ($Al_2O_3$) carrier material. The preferred loading of the LNT materials on the support body is about 200 g per liter of available flow volume, with 20 g/L BaO, 50 g/ft³ Pd, 5 g/ft³ Rh and 30 g/L manganese-based oxides.

The exhaust gas treatment system may further contribute to the treatment of the exhaust gas by oxidizing, to some extent, CO and HC to $CO_2$ and water. In order to increase the overall removal of $NO_x$, CO and HCs, the exhaust gas stream may be passed through a container housing a support body that contains an oxidation catalyst material before the exhaust gas enters the LNT reactor (not shown). In a preferred embodiment, this oxidation catalyst will comprise particles of $MnO_x$—$CeO_2$ in combination with palladium (Pd) particles. The advantages of a $MnO_x$—$CeO_2$ and Pd oxidation catalyst material are further discussed in Experiment 4 of this Specification. In another embodiment, the oxidation catalyst material may be a commercial Pt-based diesel oxidation catalyst, if the cost is justified.

The exhaust gas may be exposed to other devices or mechanical equipment not expressly shown in FIG. 1 that may or may not help produce the treated exhaust gas flow. These devices include, for example, another diesel oxidation catalyst, a three-way catalyst, a diesel particulate filter, an exhaust gas recirculation line, a turbocharger turbine, a muffler, and/or a resonator. Skilled artisans will undoubtedly know of, and understand, these and the many other devices that the exhaust gas could be exposed to.

EXPERIMENTAL

As disclosed in recently filed patent application Ser. No. 12/853,357, dated Aug. 10, 2010, manganese-containing base-metal oxides particles (specifically, $MnO_x$—$CeO_2$, $MnO_x$—$Y_2O_3$, and $MnO_x$—$ZrO_2$) were prepared and used to promote NO oxidation to $NO_2$ in a synthetic gas mixture prepared to simulate diesel engine and lean-burn engine exhaust gases. In another experiment, these manganese-based oxides were combined with a commercial palladium (Pd) catalyst material. It was found that the manganese-containing base-metal oxides could be effectively used in the oxidation of NO, CO, and low molecular weight hydrocarbons in oxygen-containing (and water containing) gas mixtures. Also, such suitably formulated and prepared mixtures could be effectively combined with suitable amounts of Pd, or even platinum (Pt) (if the cost is justified), in promoting such oxidation reactions.

Encouraged by these experiments, these manganese-based oxides were further studied for use in Lean $NO_x$ Trap (LNT) systems.

$MnO_x$, $CeO_2$, $MnO_x$—$CeO_2$, $MnO_x$—$ZrO_2$ and $MnO_x$—$Y_2O_3$ (manganese-based oxides) were prepared for use as powder catalysts by a co-precipitation method. To prepare the oxidation catalysts in powder form, appropriate amounts of metal nitrates were dissolved in deionized water at room temperature and an aqueous solution of ammonia was added as a precipitate agent until the pH value reached 10.5 with stirring. The precipitate was further aged at the same temperature for 2 hours in the mother liquid. After filtration and washing with deionized water, the obtained solid was dried at 120° C. for 12 hours and then calcined at 550° C. in air for 5 hours. The mixed oxides are designated as $MnO_x(x)$-$CeO_2$, where x is the atomic ratio of the Mn to the total metal, i.e. Mn/(Ce+Mn). For purposes of comparative experiments, particles of $MnO_x$ and of $CeO_2$ were prepared separately.

Additional storage and catalyst powder materials were prepared in the following manner. As a storage material, particles of BaO on $\gamma$-$Al_2O_3$ were prepared as follows (BaO/$\gamma$-$Al_2O_3$). Sasol CATALOX 18 HPa 150 L4, $\gamma$-alumina, was impregnated with $Ba(CH_3COO)_2$ to give a loading of 20 wt. % BaO and calcined in an oven at 550° C. for 5 hours. Particles of Rh/$CeO_2$—$ZrO_2$ were prepared starting with $CeO_2$—$ZrO_2$ mixed oxide (21 wt. % $CeO_2$ and 72 wt. % $ZrO_2$ from Rhodia) was impregnated with $Rh(NO_3)_3$ to obtain 2 wt. % Rh and calcined at 550° C. for 5 hours. Particles of Pd/$\gamma$-$Al_2O_3$ were prepared starting with $\gamma$-alumina (Sasol CATALOX 18 HPa 150 L4) was impregnated with $Pd(NO_3)_2$ and then calcined at 550° C. for 5 hrs. The loading of Pd is 4 wt. %.

In this example, to form the manganese-based oxide catalysts, approximately 4 grams of at least one manganese-based oxide, 1.4 mL alumina sol (30% of alumina) and 15 grams of water were ball milled for 18 hours, and the slurry was then washcoated onto monolith core samples. The size of the deposited manganese-based oxide particles was about 10 to 20 nanometers. This catalyst mixture did not contain platinum. The monolith core samples were ¾ inch diameter by 1 inch length, with 400 cells per square inch (cpsi), a 4 milli-inch wall thickness, and made of cordierite. After washcoating, the monolithic catalysts were dried at 120° C. and calcined at 550° C. for 5 hours in static air and then aged in an oven for 24 hours at 700° C. in 10% $H_2O$/air.

The following benchmark commercial catalysts were used in these experiments, and were washcoated onto monolith core samples, similar to above, with a loading as indicated: Pd catalyst, 80 g/ft$^3$; Pt catalyst, 50 g/ft$^3$; diesel oxidation catalyst (DOC) with Pt/Pd/Rh=43/6/0 g/ft$^3$ and a total PGM loading of 49 g/ft$^3$; and a Lean $NO_x$ trap (LNT) with PGM loading of 45 g Pt/8 g Pd/5 g Rh/ft$^3$.

Experiment 1

Three manganese-based oxides ($MnO_x$—$CeO_2$, $MnO_x$—$ZrO_2$ and $MnO_x$—$Y_2O_3$) were prepared as oxidation catalysts and used to promote NO oxidation in a synthetic oxygen and water containing gas stream. The NO oxidation activity of these manganese-based oxides was then compared to a commercial Pt-based catalyst with a Pt loading of 50 g/ft$^3$ and a $La_{0.9}Sr_{0.1}MnO_3$ catalyst.

These catalysts were tested in a quartz tubular reactor operated at atmospheric pressure by passing a simulated gas mixture through a volume of catalyst particles contained as washcoat layers on the walls of passages of a monolith. The simulated gas mixture was fed to the reactor using a series of mass flow controllers. The feed composition was 10% $O_2$, 10% $H_2O$, 10% $CO_2$ and 200 ppm NO with $N_2$ as balance. High purity commercial sources of these constituents were used. The total feed flow rate was 3.0 L/minute, corresponding to a space velocity of 25,000 h$^{-1}$. In these and following experiments, the value of space velocity refers to the ratio of the volumetric flow rate of the gas mixture (at STP) with respect to the nominal volume of the ceramic monolith (having 400 channels per square inch of inlet face area) arbitrarily based on its outer cross-sectional area and length.

The reactor was heated in a tube furnace which controlled the temperature just upstream of the catalyst. Thermocouples were used to measure the temperature upstream and downstream of the catalyst sample. The reactor outlet stream was analyzed with a Fourier Transform Infrared (FTIR) analyzer (ThermoNicolet NEXUS 670), and calibrated at 940 Torr and 165° C. A pressure controller at the outlet of the FTIR was used to maintain the calibration pressure, and the line downstream of the reactor was heated to 165° C. The lines upstream of the reactor were also heated to 165° C. to assure complete vaporization of water.

The three manganese-based oxide catalysts ($MnO_x$—$CeO_2$, $MnO_x$—$ZrO_2$ and $MnO_x$—$Y_2O_3$) showed similar NO oxidation activity, and were comparable to the commercial Pt-based catalyst when the temperature was below 250° C.; however, a better performance was observed over the base-metal oxides when the temperature was above 300° C. $La_{0.9}Sr_{0.1}MnO_3$ perovskite showed the lowest NO conversion during the temperature investigated. The steady-state NO conversions reached a maximum at about 300° C. for all three of the manganese-based oxide catalysts, while a maximum NO conversion was observed at 350° C. for the Pt and $La_{0.9}Sr_{0.1}MnO_3$ catalysts. All three of the manganese-based oxide catalysts achieved a conversion of about 80% at 300° C. and showed better performance than the Pt-based catalyst, which only achieved a conversion of 52% at the same temperature.

In sum, the manganese-based oxide catalysts showed higher NO oxidation activity than the Pt and $La_{0.9}Sr_{0.1}MnO_3$ catalysts. Comparing the three manganese-based oxide catalysts to each other, $MnO_x$—$CeO_2$ showed slightly higher $NO_x$ oxidation performance overall; thus, this catalyst was chosen for further study.

Experiment 2

In a second group of experiments, the content of Mn in the manganese-based oxide catalysts was varied, and the resulting NO oxidation activities were recorded. The steady-state % NO conversion as a function of temperature was tested over five prepared $Mn_xCe_{1-x}O_2$ catalysts, where x=0, 0.1, 0.3, 0.5 and 1. The results showed that the higher the manganese concentration, the higher NO oxidation to $NO_2$ activity, until the Mn/(Ce+Mn) atomic ratio reached 0.3. In sum, $MnO_x$ (0.3)-$CeO_2$ showed the best NO oxidation activity among all of catalysts.

Experiment 3

In a third group of experiments, NO oxidation activity of the $MnO_x$(0.3)-$CeO_2$ catalyst was evaluated in the presence of CO and HCs to simulate diesel engine exhaust. The feed composition to the reactor was changed to 10% $O_2$, 200 ppm NO, 350 ppm $C_3H_6$, 150 ppm $C_3H_8$, 3000 ppm CO, 10% $H_2O$ with a balance of $N_2$. The gases were fed using a series of mass flow controllers, and the total feed flow rate was 3.0 L/minute, corresponding to a space velocity of 25,000 $h^{-1}$.

A maximum NO conversion of 22% at 300° C. was observed, which represents a decrease from the maximum conversion of 82% observed in the previous experiments. In sum, the presence of CO and HCs over the manganese-based oxide catalyst adversely affected the oxidation of NO, with $NO_2$ formation inhibited or consumed by HCs over the $MnO_x$ (0.3)-$CeO_2$ catalyst.

For comparison, commercial Pt and Pd catalysts were also tested under the same conditions. The Pd catalyst showed higher CO/$C_3H_6$/$C_3H_8$ oxidation activity than the Pt-based catalyst; however, the NO oxidation to $NO_2$ was very poor. The Pt-based catalyst showed higher CO/$C_3H_6$/NO oxidation activity, but much lower $C_3H_8$ oxidation activity than the Pd and $MnO_x$(0.3)-$CeO_2$ catalysts individually. NO oxidation to $NO_2$ over the commercial Pt-based catalyst was also inhibited by the presence of $C_3H_6$, with the NO conversion decreasing from 20% without HCs, to nearly 0% in the presence of $C_3H_6$ at 200° C.

In sum, the $MnO_x$(0.3)-$CeO_2$ catalyst did not exhibit high NO oxidation performance in the presence of CO and HCs. And the Pd catalyst exhibited higher HC and CO oxidation performance than the Pt catalyst.

Experiment 4

Figure 7:
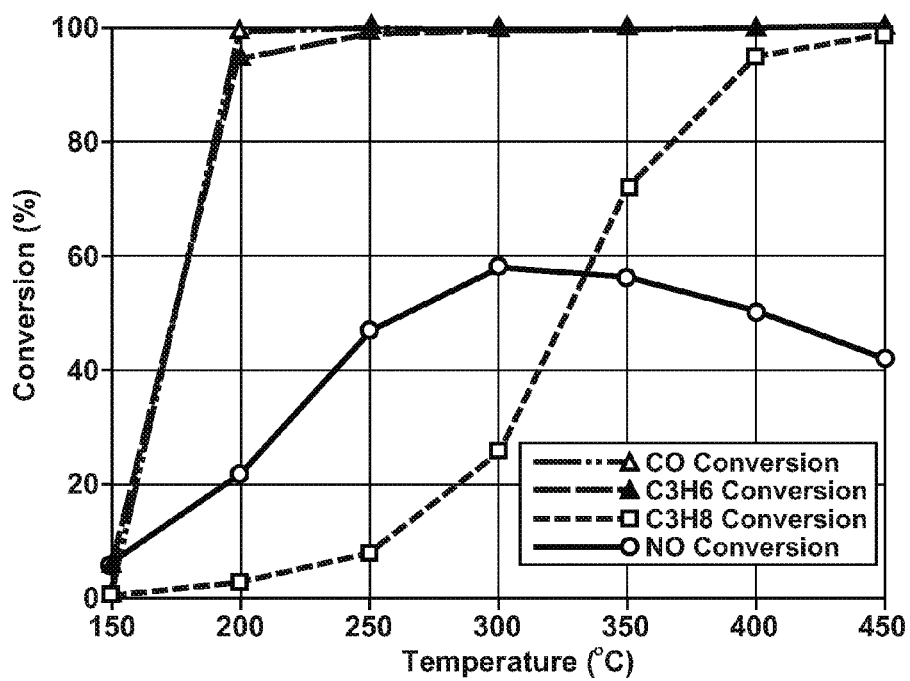
FIG. 7 is a graph of Conversion (%) vs. Temperature (° C.) showing the conversion of NO, HCs and CO by oxidation over ½" $Pd/Al_2O_3$ and ½" $MnO_x$—$CeO_2$ catalyst, with 40 g/ft³ Pd, in a synthetic diesel engine exhaust gas stream as a function of temperature. Reaction conditions: 3000 ppm CO, 200 ppm NO, 350 ppm $C_3H_6$, 150 ppm $C_3H_8$, 10% $O_2$, 10% $H_2O$, 10% $CO_2$, SV=25,000 h$^{-1}$.

In a fourth group of experiments, a half amount of a Pd catalyst was placed upstream of a $MnO_x$(0.3)-$CeO_2$ catalyst to help remove HCs and CO from a synthetic, oxygen-rich diesel exhaust stream. The oxidation performance of a Pt-based Diesel Oxidation Catalyst (DOC) was evaluated under the same conditions for comparison. FIG. 7 shows the oxidation performance of NO, HCs and CO over the 0.75"(D)×0.5" (L) Pd catalyst in front of 0.75"(D)×0.5"(L) $MnO_x$(0.3)-$CeO_2$ catalyst. The oxidation performance of the 0.75"(D)×1.0"(L) commercial Pt-based DOC is not shown. The combination of a Pd catalyst and an $MnO_x$(0.3)-$CeO_2$ catalyst significantly improved the oxidation of NO, CO and $C_3H_6$ as compared to the $MnO_x$(0.3)-$CeO_2$ catalyst alone. Additionally, CO, $C_3H_6$ and NO oxidation performance over the Pd and $MnO_x$(0.3)-$CeO_2$ catalyst was comparable to that of a commercial Pt-based DOC. Furthermore, the Pd and $MnO_x$(0.3)-$CeO_2$ catalyst showed higher $C_3H_8$ oxidation than the commercial DOC. The Pd and $MnO_x$(0.3)-$CeO_2$ catalyst did not produce $N_2O$, while 20 ppm $N_2O$ was detected over the commercial DOC at 250° C.

Experiment 5

Figure 8:
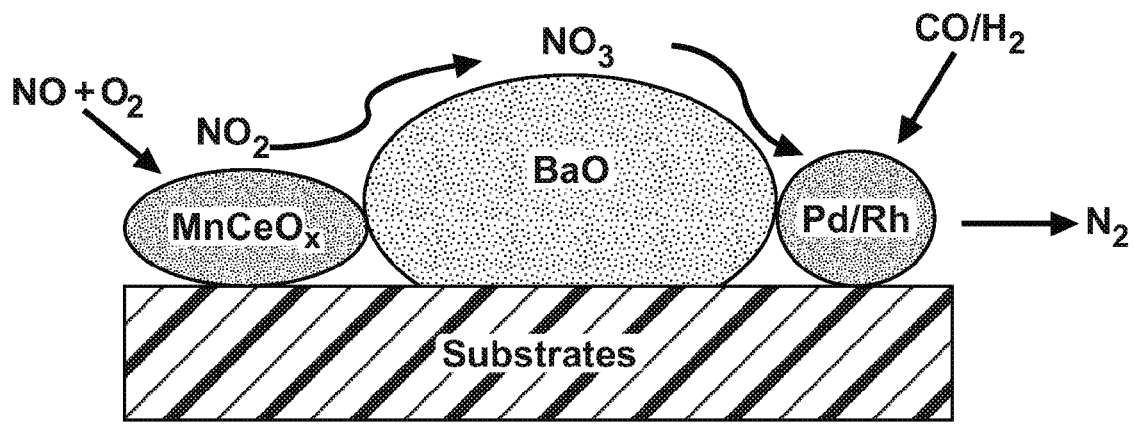
FIG. 8 is a schematic diagram of the disclosed $MnO_x$—$CeO_2$ based LNT concept.

In a fifth group of experiments, $MnO_x$—$CeO_2$ was studied for use in a Lean $NO_x$ Trap (LNT). FIG. 8 shows a preferred embodiment of the manganese-based oxide LNT.

To form the manganese-based oxide LNT catalyst material, the manganese-based oxides were ball-milled together with Rh/$CeO_2$—$ZrO_2$, Pd/$Al_2O_3$, BaO/$Al_2O_3$ and the slurry was kept at a pH of 9.0 to 9.5 by adding aqueous ammonia solution. After ball milling for 18 hours, the slurry was washcoated onto monolith core samples. The monolith core samples were ¾ inch diameter by 1 inch length, with 400 cells per square inch (cpsi), a 4 milli-inch wall thickness, and made of cordierite. The targeted total washcoat loading was 200 g/L with 20 g/L BaO, 50 g/$ft^3$ Pd, 5 g/$ft^3$ Rh and 30 g/L manganese-based oxides. After washcoating, the monolithic catalyst was dried at 120° C. and calcined at 550° C. for 5 hours in static air and then aged in an oven for 24 hours at 700° C. in 10% $H_2O$/air.

The LNT catalysts were tested in the same reactor system as the NO oxidation tests, but with a lean/rich cycling capability. The total feed flow rate was 3.0 L/min, corresponding to a space velocity of 25,000 $h^{-1}$. The gas manifold consisted of three banks of flow controllers that provide gases to the reactor. Bank A (rich feed) contained flow controllers that provided 0.5% $H_2$, 1.5% CO and 0.5% $O_2$ balanced with $N_2$ and the total flow rate was 1.0 L/min. Bank B (lean feed) contained flow controllers that provided 10% $O_2$ gases, also balanced with $N_2$, and the total flow rate was 1.0 L/min. During cyclic operations the A/B solenoid valve was switched between bank A and bank B at the desired frequency (lean/rich=60 s/5 s). Bank C contained the gases that did not cycle (NO, $CO_2$, $SO_2$ and $N_2$) and the flow rate was 2 L/min. Therefore the total gas flow rate was at 3 L/min on a dry gas basis, corresponding to a space velocity of 25,000 $h^{-1}$.

The standard LNT test conditions of the lean mixture gases included 100 ppm NO, 10% $O_2$, 10% $H_2O$, 10% $CO_2$, 0% $H_2$, 0% CO, 500 ppm $C_3H_6$/$C_3H_8$ and $N_2$ as a balance. The duration of the lean cycle was 60 seconds, and the space velocity was 25,000 $h^{-1}$. The rich mixture gases included 100 ppm NO, 0.5% $O_2$, 10% $H_2O$, 10% $CO_2$, 0.5% $H_2$, 1.5% CO, 500 ppm $C_3H_6$/$C_3H_8$ and $N_2$ as a balance. The duration of the lean cycle was 5 seconds, and the space velocity was 25,000 $h^{-1}$.

Figure 9:
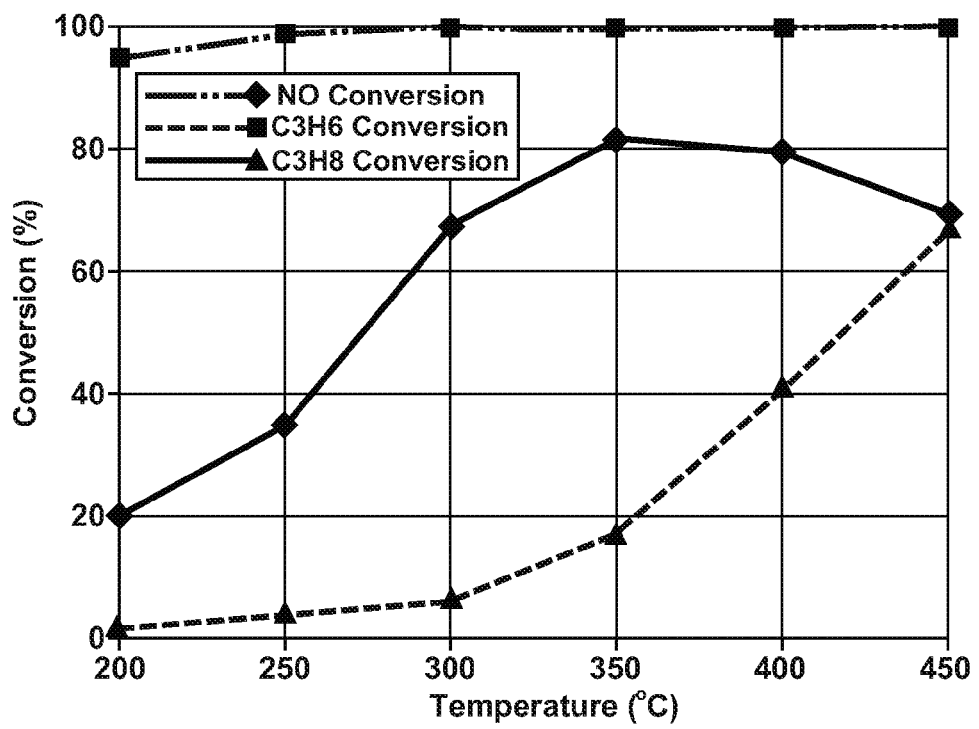
FIG. 9 is a graph of Conversion (%) vs. Temperature (° C.) showing the conversion of NO, $C_3H_6$, and $C_3H_8$ over a manganese-based oxide LNT catalyst, with Pt/Pd/Rh=0/50/5 g/ft³, in a synthetic diesel engine exhaust gas stream with lean/rich cycling capabilities as a function of temperature. Reaction conditions: 100 ppm NO, 350 ppm $C_3H_6$, 150 ppm $C_3H_8$, 10% $H_2O$, 10% $CO_2$, SV=25,000 h$^{-1}$; lean: 10% $O_2$ and rich: 1.5% CO, 0.5% $H_2$ and 0.5% $O_2$; lean/rich=60 s/5 s.

The manganese-based oxide LNT was tested and compared to a commercial Pt-based LNT catalyst. As discussed above, NO oxidation over the $MnO_x$—$CeO_2$ catalyst was inhibited by the presence of HCs and CO, but the combination of $MnO_x$—$CeO_2$ and Pd as a catalyst resulted in excellent HC, CO and NO oxidation. Accordingly, the manganese-based oxide LNT was evaluated with $MnO_x$—$CeO_2$ and Pd as catalysts. When comparing the NO conversion activity as a function of temperature over the manganese-based oxide LNT and a commercial Pt-based LNT, similar NO reduction efficiencies were observed. FIG. 9 shows the conversion efficiency of the manganese-based oxide LNT as a function of temperature. At 200° C., 20% NO reduction was achieved over both catalysts and reached a maximum NO conversion (80%) at 350 to 400° C. Both catalysts showed similar $C_3H_6$ and $C_3H_8$ oxidation performance. At 250° C., nearly 100% $C_3H_6$ conversion was obtained on both catalysts. Therefore, $MnO_x$—$CeO_2$ has the potential to replace Pt in a conventional LNT.

Experiment 6

In another group of experiments, $NO_x$ adsorption and desorption tests were carried out over manganese-based oxide catalyst using the same reactor system as the NO oxidation tests. The lean mixture gases included 200 ppm NO, 10% $O_2$, 10% $CO_2$, 5% $H_2O$ and $N_2$ as a balance, and the space velocity was 25,000 $h^{-1}$. Prior to the test, the catalyst was first saturated in 200 ppm NO, 10% $O_2$, 10% $H_2O$, 10% $CO_2$ at 100° C. After the outlet $NO_x$ concentration reached the inlet concentration of $NO_x$ (200 ppm), the catalyst was then heated from 100 to 650° C. with a ramp rate of 10° C./min in the same conditions. The concentration of NO and $NO_2$ in the catalyst outlet was monitored by the FTIR. As long as NO was stored, the exit $NO_x$ concentration was lower than the inlet $NO_x$ concentration. Thermal decomposition of the stored NO species led to increasing $NO_x$ exit concentration. The amount of $NO_x$ trapped was estimated by integration of the curves below the baseline (200 ppm) and the amount of $NO_x$ released was estimated by integration of the curves above the baseline.

Figure 10:
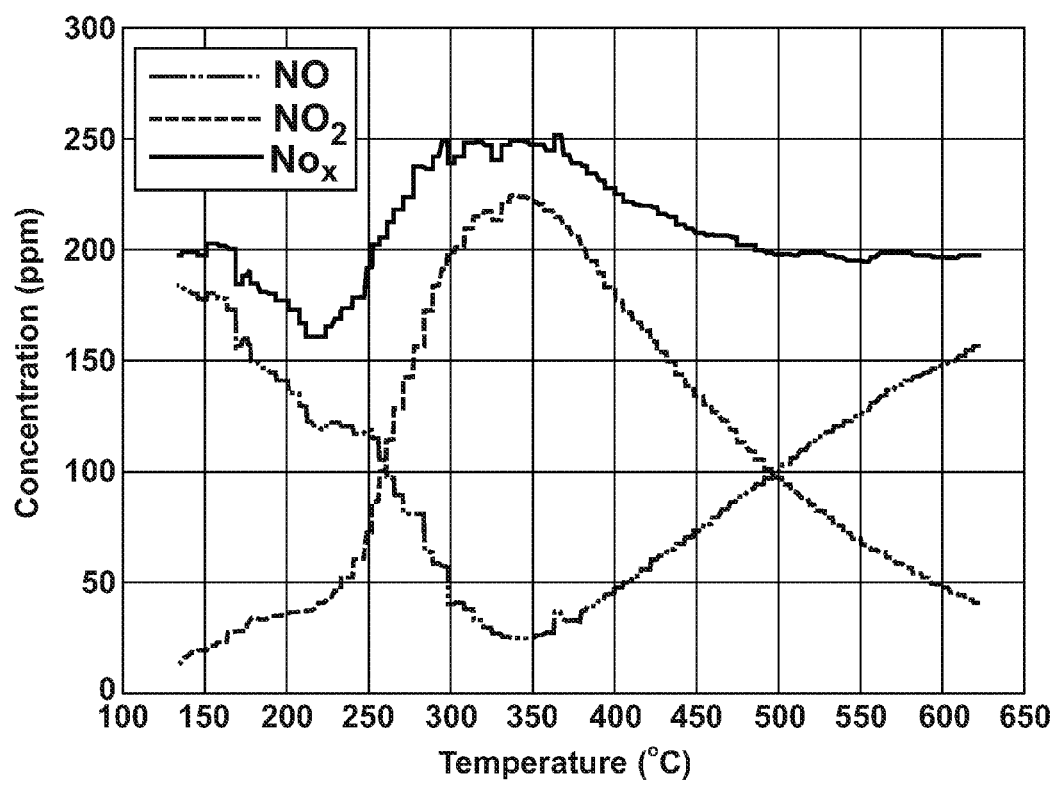
FIG. 10 is a graph of Concentration (ppm) vs. Temperature (° C.) showing NO, $NO_2$, and NO concentration profiles as a function of temperature from 100 to 650° C. in a synthetic oxygen and water containing gas stream over a $MnO_x(0.3)$-$CeO_2$ catalyst. Reaction conditions: 200 ppm NO, 10% $O_2$, 10% $H_2O$, 10% $CO_2$, temperature ramp rate=10° C./min, SV=25,000 h$^{-1}$.

FIG. 10 shows the NO, $NO_2$ and $NO_x$ concentration profiles as a function of temperature from 150 to 650° C. over the $MnO_x(0.3)$-$CeO_2$ catalyst under lean conditions. $NO_x$ started to adsorb on the $MnO_x(0.3)$-$CeO_2$ catalyst at 175° C. and started to desorb at 250° C. and the adsorbed NO was completely removed at 500° C. The $MnO_x(0.3)$-$CeO_2$ catalyst exhibited the highest $NO_2$ formation at 340° C. with 225 ppm. The NO adsorption capacity of the $MnO_x(0.3)$-$CeO_2$ catalyst, based on the desorption curve, is 12 mmol/L.

In FIG. 10, it can be seen that, over the $MnO_x(0.3)$-$CeO_2$ catalyst, the area under the adsorption and the desorption curves is different, with the adsorption peak being smaller than the desorption trough. The $NO_x$ adsorption capacity based on the adsorption curve is 4 mmol/L, while the $NO_x$ adsorption capacity based on the desorption curve is 12 mmol/L, indicating that 8 mmol/L of $NO_x$ was adsorbed at temperatures below 150° C. during saturation. In sum, these results indicate that the $MnO_x(0.3)$-$CeO_2$ catalyst should have the capability to adsorb NO at lower temperatures.

Experiment 7

In yet another group of experiments, $NO_x$ Temperature Programmed Desorption (TPD) was carried out in the same reactor as the NO oxidation tests. Prior to the test, the manganese-based oxide catalysts were first saturated in 200 ppm NO, 10% $O_2$, 10% $H_2O$, 10% $CO_2$ at 150° C. After the outlet $NO_x$ concentration reached the inlet concentration of $NO_x$ (200 ppm), the NO gas was shut off until no $NO_x$ could be detected by FTIR. The TPD test was then run in 10% $O_2$, 10% $H_2O$ and 10% $CO_2$ with $N_2$ as balance.

The results of $NO_x$ TPD carried out for the $MnO_x(0.3)$-$CeO_2$ catalyst showed one broad peak for $NO_2$ and a small NO peak during the TPD, with a very wide temperature window from 200 to 450° C. These peaks indicate that the adsorbed $NO_x$ started to desorb at 200° C. and was completely desorbed at 450° C. The total $NO_x$ adsorption capacity at 150° C. is 9 mmol/L, which is consistent with the difference (8 mmol/L) between the $NO_x$ adsorption capacity that was calculated based on the adsorption and desorption curves in FIG. 10.

In conclusion, the $MnO_x$—$CeO_2$ catalyst was found to have excellent $NO_x$ adsorption capacity. As such, the $MnO_x$—$CeO_2$ catalyst may be used in the LNT as a storage material to help store $NO_x$ by adsorption.

Embodiments of practices of the invention have been presented to illustrate the invention and not to limit its scope. For example, as stated in this specification, manganese-based oxide catalysts of this invention have general utility in the oxidation of NO in gas mixtures containing oxygen, nitrogen, and water. In general, they may be used in particulate form and deposited on surfaces of a ceramic monolith, metallic substrate, or other suitable substrate.

The invention claimed is:

1. A method for converting a mixture of nitrogen oxides ($NO_x$), comprising nitrogen oxide (NO) and nitrogen dioxide ($NO_2$), to nitrogen ($N_2$) in an exhaust gas of an internal combustion engine, the engine operating by burning a mixture of air and fuel that is controllable between (i) a mixture in which the content of fuel is lean with respect to the stoichiometric air-to-fuel mass ratio, and (ii) a mixture in which the content of fuel is rich with respect to the stoichiometric air-to-fuel mass ratio; the method comprising:

passing the exhaust gas from the engine in contact with each of:

an oxidation catalyst material for oxidation of NO to $NO_2$ in the exhaust gas, the oxidation catalyst material comprising particles of co-precipitated mixed oxides of two or more base metals including manganese, the co-precipitated mixed oxides consisting of one or more mixed oxides selected from the group consisting of $MnO_x$—$CeO_2$, $MnO_x$—$ZrO_2$ and $MnO_x$—$Y_2O_3$, and a storage material for temporarily removing $NO_x$ from the exhaust gas when the engine operates in a fuel-lean mode, and a reduction catalyst material to reduce NO and $NO_2$ to $N_2$ when the engine operates in a fuel-rich mode; and managing the operation of the engine by cycling the air-to-fuel mass ratio between time periods of fuel-lean mode and time periods of fuel-rich mode, the duration of the time periods being such that (i) oxygen in the exhaust during a cycle's fuel-lean mode promotes the oxidation of NO to $NO_2$, and $NO_x$ is temporarily removed from the exhaust gas, and (ii) fuel constituents in the exhaust during the cycle's fuel-rich mode are available for the reduction of $NO_x$ to $N_2$ before the exhaust is discharged to the ambient atmosphere.

2. The method of claim 1 in which the oxidation catalyst material comprises particles of $MnO_x$—$CeO_2$ and the atomic ratio of Mn/(Ce+Mn) is 0.3.

3. The method of claim 1 in which the oxidation catalyst material comprises mixed oxide particles of $MnO_x$—$CeO_2$ and particles of palladium supported by an aluminum oxide or cerium-zirconium oxide carrier material.

4. The method of claim 1 in which the oxidation catalyst material comprises mixed oxide particles of $MnO_x$—$CeO_2$ and particles of palladium supported by the particles of $MnO_x$—$CeO_2$.

5. The method of claim 1 in which mixed oxide particles of $MnO_x$—$CeO_2$ are employed to serve as both the oxidation catalyst material and the storage material, wherein the particles of $MnO_x$—$CeO_2$ temporarily store $NO_x$ by adsorption.

6. The method of claim 1 in which the reduction catalyst material consists of particles of at least one of palladium and rhodium, wherein the particles are supported by an aluminum oxide or a cerium-zirconium oxide carrier material.

7. The method of claim 1 which further comprises passing the exhaust gas from the engine in contact with a supplemental catalyst material for the oxidation of carbon monoxide (CO) to carbon dioxide ($CO_2$), and various hydrocarbons (HCs) to $CO_2$ and water, before the exhaust gas contacts the oxidation catalyst material for oxidation of NO to $NO_2$.

8. The method of claim 7 in which the supplemental catalyst material comprises particles of co-precipitated mixed oxides of two or more base metals including manganese.

9. The method of claim 1 in which the oxidation catalyst material comprises suitably supported mixed oxide particles of $MnO_x$—$CeO_2$ and particles of palladium, the storage material comprises suitably supported mixed oxide particles of $MnO_x$—$CeO_2$ and particles of barium oxide, and the reduction catalyst material comprises suitably supported particles of rhodium.

10. The method of claim 9 in which the particles are suitably supported by a carrier material comprising at least one of an aluminum oxide, a cerium-zirconium oxide, and a mixed oxide of two or more base metals including manganese.

11. The method of claim 1 in which particles of the oxidation catalyst material, the storage material, and the reduction catalyst material are intermixed.

12. The method of claim 1 in which the exhaust gas flows into contact with particles of the oxidation catalyst material and later into contact with a particulate mixture of the storage material and reduction catalyst material.

13. The method of claim 12 in which the storage material also comprises particles of co-precipitated mixed oxides of two or more base metals including manganese.

14. The method of claim 1 in which the exhaust gas flows into contact with a particulate mixture of the oxidation catalyst material and the storage material and later into contact with particles of the reduction catalyst material.

15. The method of claim 14 in which mixed oxide particles of $MnO_x$—$CeO_2$ are present in an amount sufficient to serve as both the oxidation catalyst material and the storage material.

16. The method of claim 1 in which the exhaust gas from the engine is passed through a container housing a support body so that the exhaust gas may contact each of the oxidation catalyst material, the storage material, and the reduction catalyst material which are deposited on wall surfaces of flow-through channels of the support body.

17. The method of claim 16 in which the amount of oxidation catalyst material deposited on the wall surfaces is about 30 grams per liter of available flow-through volume through the support body.

18. The method of claim 16 in which the amount of oxidation catalyst material, storage material, and reduction catalyst material deposited on the wall surfaces is about 200 grams per liter of available flow-through volume through the support body.

* * * * *